US009694811B1

(12) United States Patent
Lai

(10) Patent No.: US 9,694,811 B1
(45) Date of Patent: Jul. 4, 2017

(54) INTELLIGENT INTERVENTION METHOD BASED ON INTEGRATED TPMS

(71) Applicant: Yanping Lai, Fujian (CN)

(72) Inventor: Yanping Lai, Fujian (CN)

(*) Notice: Subject to any disclaimer, the term of this patent is extended or adjusted under 35 U.S.C. 154(b) by 15 days.

(21) Appl. No.: 14/979,617

(22) Filed: Dec. 28, 2015

(51) Int. Cl.
*A01B 69/00* (2006.01)
*B62D 6/00* (2006.01)
*B60W 30/02* (2012.01)
*B60C 23/04* (2006.01)
*B62D 15/02* (2006.01)
*B60T 8/172* (2006.01)

(52) U.S. Cl.
CPC ......... *B60W 30/02* (2013.01); *B60C 23/0438* (2013.01); *B60C 23/0486* (2013.01); *B60C 23/0488* (2013.01); *B60T 8/1725* (2013.01); *B62D 15/025* (2013.01); *B60T 2270/10* (2013.01)

(58) Field of Classification Search
CPC ............... B60W 30/02; B60C 23/0438; B60C 23/0486; B60C 23/0488; B60T 8/1725; B60T 2270/10; B62D 15/025
USPC ............ 701/41, 34.4, 70; 340/432, 442, 447
See application file for complete search history.

(56) References Cited

U.S. PATENT DOCUMENTS

| | | | | |
|---|---|---|---|---|
| 5,583,483 A * | 12/1996 | Baumann | ............... | B60C 23/061 340/432 |
| 2006/0178853 A1* | 8/2006 | Chen | ....................... | G01L 13/00 702/140 |
| 2007/0075851 A1* | 4/2007 | Lauer | ................... | B60C 23/0416 340/447 |
| 2012/0053792 A1* | 3/2012 | Xiao | ...................... | B60T 8/1755 701/41 |
| 2012/0282548 A1* | 11/2012 | Enomoto | ............... | G03F 7/0045 430/284.1 |
| 2013/0035834 A1* | 2/2013 | Couch | ..................... | B60C 23/20 701/70 |
| 2013/0327136 A1* | 12/2013 | Kretschmann | ...... | B60C 23/0415 73/146.3 |
| 2015/0061852 A1* | 3/2015 | Fu | ........................ | B60C 23/0474 340/442 |
| 2015/0158347 A1* | 6/2015 | Fritz | .................... | B60C 23/0401 340/442 |
| 2015/0231932 A1* | 8/2015 | Singh | .................... | B60C 11/246 701/34.4 |
| 2016/0347134 A1* | 12/2016 | Choi | .................... | B60C 23/0488 |

* cited by examiner

Primary Examiner — Shardul Patel

(57) ABSTRACT

An intelligent intervention method based on an integrated tire pressure monitoring system includes monitoring a tire pressure and a tire temperature of a vehicle, and monitoring, a wheel speed of the vehicle; transmitting the tire pressure, the tire temperature and the wheel speed to a host; judging in real time whether the vehicle is in a normal status or in an abnormal status, via integrating the tire pressure, the tire temperature and the wheel speed; producing a deviation signal, when the tire pressure, the tire temperature and the wheel speed deviate from normal thresholds and transmitting the deviation signal to an intelligent intervention system; and performing intelligent intervention to slow down the vehicle in a straight line until the vehicle stops, when the deviation signal is received. The method enables the vehicle to run safely until stopping even in case of tire blowout, so as to prevent rollover or collision.

16 Claims, 1 Drawing Sheet

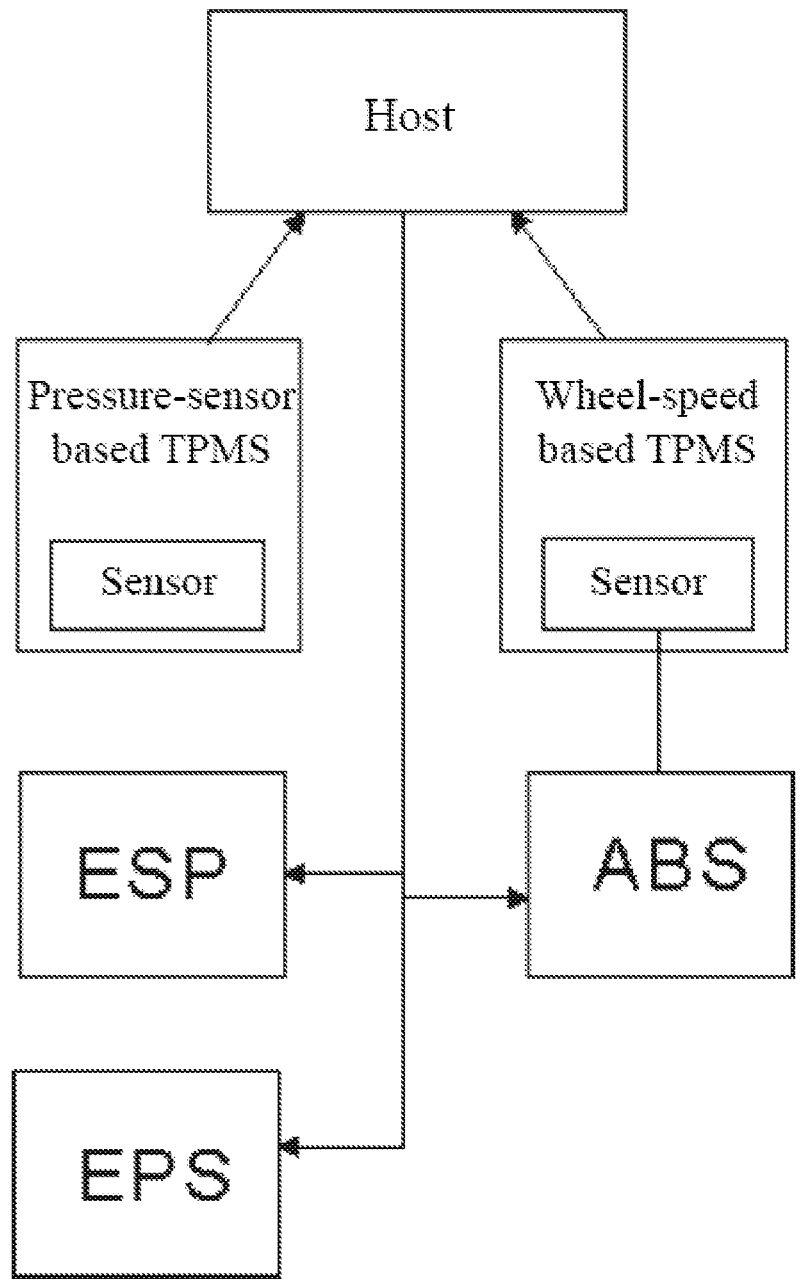

INTELLIGENT INTERVENTION METHOD BASED ON INTEGRATED TPMS

TECHNICAL FIELD OF THE INVENTION

The invention relates to the auto intelligent control field, in particular to an intelligent intervention method based on integrated TPMS.

BACKGROUND OF THE INVENTION

TPMS is the English acronym for Tire Pressure Monitoring System and it is a tire pressure and temperature monitoring system used to monitor the perspective blind area during driving. Although the concept of TPMS (Tire Pressure Monitoring System) is quite new in China, the TPMS regulations have been prepared and enforced in USA by federal legislation.

The existing tire pressure monitoring systems are mainly divided into two types:

One type is Pressure-Sensor Based (direct) Tire Pressure Monitoring System (PSBTPMS), which utilizes a pressure sensor installed on the tire to measure tire pressure and a temperature sensor installed on the tire to measure tire temperature, a radio transmitter to transmit the pressure information from inside the tire to the system on a central receiver module and then display the tire pressure data. When the tire shows any high pressure, low pressure or high temperature, the system will generate an alarm to warn the owner. It is of pre-event active defense type.

The other type is Wheel-Speed Based (indirect) Tire Pressure Monitoring System (WSBTPMS), which compares the speed difference of tires through the wheel speed sensor of the ABS (Anti-lock Braking System), so as to monitor the tire pressure. The ABS determines whether the wheel is locked through the wheel speed sensor, so as to decide whether to start the ABS. When the tire pressure is reduced, the weight of the vehicle will reduce the tire diameter, thus changing the speed of the vehicle. Such change of the vehicle speed will trigger the alarm system of the WSB to warn the owner to pay attention to the low tire pressure. Therefore, it is passive.

The statistics indicate that on the domestic expressways, the traffic accidents arising from tire blowout account for 70% of the total. In the USA, the proportion is as high as 80%. The reasons for tire blowout can be roughly classified as follows: (1) Too high tire temperature resulting in tire pressure rise. (2) A change of the atmospheric pressure resulting in too high tire pressure. (3) The tire leakage. Since the economic losses arising from tire blowout are huge, how to prevent tire blowout is an important subject in safe driving. It is also a prevent-oriented common subject.

SUMMARY OF THE INVENTION

However, the inventor's invention becomes a pressing need for safe driving, and the technical issue solved in the invention is how to reduce the possibilities of accidents after tire blowout and enable the vehicle to safely park. Therefore, the applicant has done a creative work to provide an intelligent intervention method based on integrated TPMS, enabling safe parking of the vehicle after intelligent intervention even in case of tire blowout.

The technical scheme adopted is as follows:

An intelligent intervention method based on an integrated tire pressure monitoring system (TPMS) having a direct TPMS and an indirect TPMS, the method including:

monitoring, by the direct TPMS, a tire pressure and a tire temperature of a vehicle, and monitoring, by the indirect TPMS, a wheel speed of the vehicle;

transmitting the tire pressure, the tire temperature and the wheel speed to a host;

judging in real time, by the host, whether the vehicle is in a normal status or in an abnormal status, via integrating the tire pressure, the tire temperature and the wheel speed;

producing, by the host, a deviation signal, when the tire pressure, the tire temperature and the wheel speed deviate from normal thresholds and transmitting the deviation signal to an intelligent intervention system; and performing, by the intelligent intervention system, intelligent intervention to slow down the vehicle in a straight line until the vehicle stops, when the deviation signal is received.

In an embodiment, the intelligent intervention system may at least include an electric power steering (EPS) system, an electronic stability program (ESP) system and an anti-lock braking (ABS) system.

In an embodiment, the intelligent intervention method based on an integrated TPMS may include: transmitting, by the host, the deviation signal to the EPS system, the ESP system and the ABS system.

In an embodiment, the intelligent intervention method based on an integrated TPMS may include: transmitting, by the host, the deviation signal to a first intelligent intervention system set; and transmitting, by a system that belongs to the first intelligent intervention system set, the deviation signal to a second intelligent intervention system set; wherein the EPS system, the ESP system and the ABS system are respectively assigned to the first intelligent intervention system set or the second intelligent intervention system set.

In an embodiment, the intelligent intervention method based on an integrated TPMS may include: transmitting, by the host, the deviation signal to any system of the EPS system, the ESP system and the ABS system; and sequentially transmitting, at first by the system that has received the deviation signal from the host, the deviation signal to other systems of the EPS system, the ESP system and the ABS system from one to another.

In an embodiment, performing the intelligent intervention may include: adjusting a steering wheel angle, a gear and an output or a speed of the tire.

In an embodiment, the host may be an individual host or a host integrated in a body control module.

In an embodiment, the vehicle in the abnormal status may be a vehicle that has a flat tire.

There is also provided an intelligent intervention apparatus including:

an intelligent intervention system that performs intelligent intervention for a vehicle;

an integrated tire pressure monitoring system (TPMS) including:
a direct TPMS that monitors a tire pressure and a tire temperature of the vehicle; and
an indirect TPMS that monitors a wheel speed of the vehicle;

a host coupled with the integrated TPMS and configured to receive the tire pressure, the tire temperature and the wheel speed;
judge in real time whether the vehicle is in a normal status or in an abnormal status via integrating the tire pressure, the tire temperature and the wheel speed;

produce a deviation signal when the tire pressure, the temperature and the wheel speed deviate from normal thresholds; and transmit the deviation signal to the intelligent intervention system;

wherein the intelligent intervention system performs the intelligent intervention to slow down the vehicle in a straight line until the vehicle stops, when the deviation signal is received.

The advantages of the invention are as follows:

The host or the body control module containing the host are used for real-time monitoring and intelligent intervention, and such intelligent intervention systems as EPS system, ESP system and ABS system are used for intelligent intervention, enabling the vehicle to run safely until stopping and prevent rollover or collision in case of tire blowout.

BRIEF DESCRIPTION OF THE DRAWING

FIG. 1 is the flow chart illustrating the invention method conceived by the inventor.

DETAILED DESCRIPTION OF THE EMBODIMENTS

An intelligent intervention method based on integrated TPMS, comprising the following steps:

S1, wherein, the pressure-sensor based TPMS monitors the tire pressure and the temperature in real time, and the wheel-speed based TPMS monitors the wheel speed in real time, and the said tire pressure, temperature and wheel speed signals are transmitted to the host or the body control module containing the host in real time;

Wherein, the integrated TPMS integrates the pressure-sensor based TPMS and the wheel-speed based TPMS.

Wherein, the pressure-sensor based TPMS monitors the tire pressure and the temperature in real time and it is configured with one or more sensors to measure the tire parameter values, for example, the sensors can be configured as a pressure sensor to measure the tire pressure and other additional sensors such as one or more temperature sensors. The sensors can be located inside or outside the tires and can be mounted in or on the tires, attached to the tires, embedded into the tires or otherwise coupled to the tires for easy determination of tire pressure and temperature.

In order to transmit the tire pressure and temperature in real time (continuously transferring or transmitting or sending the parameters within a short time like 1 S) and guarantee transfer efficiency, the pressure sensor and the temperature sensor can be connected with sensor chips, the data ports of the sensors are connected with RF transmitters and the sensor chips may include digital signal processing units and power managers, etc., so the sensors monitor the tire pressure and temperature in real time and transmit the parameters to the host or the body control module containing the host in real time through the RF transmitter.

The body control module is a larger control and management system integrating the host, which belongs to the scope considered in the embodiments of the invention, but the integrated host still plays a major role. For briefness of the description, the undermentioned host includes the independent host or the host in the body control module.

On one hand, the host is connected with a RF receiver to receive the tire pressure and temperature values transmitted from the pressure-sensor based TPMS in real time.

On the other hand, the wheel-speed based TPMS monitors the wheel speed in real time and usually measures the tire speed through the ABS system (acronym of Anti-lock Braking System). For example, the ABS system is connected with several speed sensors mounted on the four wheels of the vehicle to monitor the wheel speeds in real time. Of course, the speed signals can also be generated by the magnetic sensors installed close to the axletrees and sensing the magnetic variations arising from the rotation of the axletrees. Therefore, the speed signals can be received by the ABS system in real time. Usually, the ABS system is connected with the host and configured with an Electronic Control Unit (ECU), and the speed signal can be processed by the ABS system itself and then transmitted to the host in real time.

Therefore, S1 can be well completed by the aforementioned technical means and then switched to S2.

S2, wherein, the host or the body control module containing the host integrates tire pressure, temperature and wheel speed to judge in real time whether the vehicle is normal or abnormal;

The tire pressure, the temperature and the speed parameter received by the host can be processed, compared and judged by an internal arithmetic unit, specifically, the tire pressure data are compared with the tire pressure threshold set by the program to judge whether it is in the normal state within the threshold or in the abnormal state beyond the threshold. The temperature and the speed are judged with reference to above to comprehensively judge whether the current vehicle state is normal or abnormal. It can be realized by configuring the corresponding processing chip with the corresponding algorithm in the host. Certainly, the chip can be directly configured in the host or a new algorithm or data processor can be added to the original chip in the host. This can be achieved by the technicians in the field, so both the added chip and the built-in new chip belong to the scope considered in the invention.

Therefore, S2 can be well completed by the aforementioned technical means and then switched to S3.

S3, wherein, when the vehicle has a flat tire the tire pressure, the temperature and the wheel speed deviate from the normal thresholds, the deviation signals are transmitted to the intelligent intervention system. The intelligent system at least comprises an EPS system, an ESP system and an ABS system, given as examples for illustration.

Since many accidents arose from tire blowout, the prevention-oriented method usually adopted in the existing technologies still fails to prevent tire blowout. The inventor considers how to represent the tire blowout in the form of data within a short time. That is to say, when the vehicle has a flat tire, the tire pressure, the temperature and the wheel speed deviate from the normal thresholds, the deviation degree is adequate to enable the host to immediately judge that the vehicle has an abnormal state of tire blowout at present, and then the deviation signals are immediately transmitted to the EPS system (acronym of Electric Power Steering), the ESP system (acronym of Electronic Stability Program) and the ABS system. The "Immediately" means completion within 1-3 s; all of the EPS system, the ESP system and the ABS system are configured with an Electronic Control Unit (ECU) to receive the deviation signal.

The deviation signals are transmitted to the EPS system, the ESP system and the ABS system in various forms. The most direct and simplest form is that the host directly and simultaneously transmits the deviation signals to the EPS system, the ESP system and the ABS system of the vehicle. There are also other forms, for example, the second form is as follows: The host transmits the deviation signals to one or two of the EPS system, the ESP system and the ABS system of the vehicle, and then the selected system or one of the selected systems transmits the deviation signals to the system that has not been selected. An example is given for illustration. The host transmits the deviation signals to the EPS system and the ESP system and then the ESP system transmits the deviation signals to the ABS system. The third form is that the host transmits the deviation signals to one of the EPS system, the ESP system and the ABS system of the vehicle, then the selected system transmits the deviation signals to one of the other systems which are not selected, and then the one of the other systems transmits the deviation signals to another system which is not selected. An example is given for illustration. After the host transmits the deviation signals to the ESP system, the ESP system transmits the deviation signals to the EPS system and then the EPS system transmits the deviation signals to the ABS system. Obviously, this serial transmission mode will generate a chronological order, but it is also considered in the invention in spite that the first transmission mode is more preferable.

No matter which transmission mode is adopted, the deviation signals are immediately (within 1-3 s) transmitted to the EPS system, the ESP system and the ABS system.

Therefore, S3 can be completed by the aforementioned technical means and then switched to S4. It is the means and aims finally achieved by the invention.

S4, wherein, the intelligent intervention system receives the deviation signals and performs the intelligent intervention to slow down the vehicle in a straight line until the vehicle stops.

Below the EPS system, the ESP system and the ABS system included in the intelligent intervention system are given as the examples to illustrate how to intervene the vehicles.

The EPS system directly provides the power-assisted steering through its electric power machine, with such characteristics as simple adjustment, flexible assembly and providing the power-assisted steering under various conditions. The electronic control unit of the EPS system detects the deviation signals and then performs the intervention such as steering (or turning) according to the pre-setting. More specifically, the electronic control unit receives the deviation signals and issues the commands to a motor controller according to the signals (for example, the current wheel speed, the tire pressure and the temperature), enabling the motor to output the power-assisted steering torque of the corresponding value and direction and generating auxiliary power to adjust steering.

The ESP system is used to help to keep a dynamic balance. For example, when the vehicle has a flat tire, the body is propelled towards the external curve. At this time, the ESP system prevents the vehicle from being trapped in dangers such as rollover by braking the right side. Specifically, the Electronic Control Unit (ECU) calculates the actual deviation degree of the vehicle according to the signals (for example, the speed) as well as other auxiliary signals such as the self-contained wheel speed sensor and lateral deflection rate sensor and then utilizes the self-contained systems such as the BAS (Brake Assist System) and the ASR (Acceleration Slip Regulation) to brake the tires not blown out, including adjusting the gear and the output or speed of the tire, enabling the vehicle to slow down, stabilize and continue to run forward in a straight line.

The ABS system coordinates with the ESP system in braking. In the braking process, when the electronic control unit judges that the wheel tends to be locked according to the wheel speed signal among the deviation signals, ABS enters the anti-lock braking pressure regulation process. For example, when the electronic control unit judges that the right front wheel tends to be locked, the ABS system regulates and controls the braking pressure of the right front wheel. Currently, the ABS system is a mature system to regulate the anti-lock braking pressure of the wheel tending to be locked in the braking process, so as to further prevent the vehicle from sideslip and rollover and enable the vehicle to continue to slow down in a straight line until the vehicle stops. The ABS has good steerability in case of emergency braking, thus avoiding serious friction between the tire and the ground and enabling to park the vehicle within a short time (for example, within 1 min).

Therefore, the EPS system, the ESP system and the ABS system coordinate with each other to perform intelligent intervention to slow down the vehicle in a straight line until the vehicle stops. The EPS system, the ESP system and the ABS system complete the intelligent intervention according to the pre-setting and trigger the operation through the deviation signals. Once they receive any deviation signal indicating the abnormal state of tire blowout, they will perform the corresponding intelligent intervention within 1-3 s.

In case of tire blowout, the deviation signal can be embodied as a sudden change of the parameter value, and can be immediately judged and transmitted by the host to the EPS system, the ESP system and the ABS system, so the intelligent intervention is immediate.

The overall steps can be generally and intuitively understood through FIG. 1, which is only a schematic chart indicating the inventor's invention concept map.

It shall be noted that the inventor considers with the technological development or measurement by the technicians in the field according to the actual performances, it is possible to add other systems to the intelligent intervention system to further intervene the vehicle or integrate the EPS system, the ESP system and the ABS system into one or two system(s) or split the EPS system, the ESP system and the ABS system into more systems. When the intervention function is the same as or equivalent to the intelligent intervention in the invention or they have equivalent technologies or some conventional technical means are added or canceled, no matter adding systems or integrating the EPS system, the ESP system and the ABS system into fewer systems or splitting them into more systems, they shall belong to the scope of protection of the invention.

In the intelligent intervention method based on integrated TPMS in the invention, the parameter data of the pressure-sensor based TPMS and the wheel-speed based TPMS are integrated and transmitted to the host for comprehensive judgment, and the host can accurately judge the vehicle state in real time. When the vehicle has a flat tire, the deviation signals can be transmitted in real time to the intelligent intervention systems such as the EPS system, the ESP system and the ABS system for intelligent intervention, so as to prevent the vehicle from rollover or collision in case of tire blowout. Therefore, the method in the invention is very important and urgently required for prevention of the accidents arising from tire blowout.

Although the technical scheme of the invention is described in details above, the scope of protection of the invention is not limited to the detailed method and the technicians in the field can obtain more equivalent and varied embodiments on such basis, for example, regarding the method of receiving the speed, tire pressure and temperature signals by the host, other methods equivalent to the synchronous and real-time receiving method in this embodiment can be adopted and they shall belong to the scope of protection of the invention. That is to say, all equivalent embodiments or variations involving the art spirit of the invention shall be included in the scope of protection of the invention.

What is claimed is:

1. An intelligent intervention method based on an integrated tire pressure monitoring system (TPMS) having a direct TPMS and an indirect TPMS, the method comprising:
monitoring, by the direct TPMS, a tire pressure and a tire temperature of a vehicle, and monitoring, by the indirect TPMS, a wheel speed of the vehicle;
transmitting the tire pressure, the tire temperature and the wheel speed to a host;
judging in real time, by the host, whether the vehicle is in a normal status or in an abnormal status, via integrating the tire pressure, the tire temperature and the wheel speed;
producing, by the host, a deviation signal, when the tire pressure, the tire temperature and the wheel speed deviate from normal thresholds and transmitting the deviation signal to an intelligent intervention system; and
performing, by the intelligent intervention system, intelligent intervention to slow down the vehicle in a straight line until the vehicle stops, when the deviation signal is received.

2. The intelligent intervention method based on an integrated TPMS according to claim 1, wherein the intelligent intervention system at least comprises an electric power steering (EPS) system, an electronic stability program (ESP) system and an anti-lock braking (ABS) system.

3. The intelligent intervention method based on an integrated TPMS according to claim 2, comprising:
transmitting, by the host, the deviation signal to the EPS system, the ESP system and the ABS system.

4. The intelligent intervention method based on an integrated TPMS according to claim 2, comprising:
transmitting, by the host, the deviation signal to a first intelligent intervention system set; and
transmitting, by a system that belongs to the first intelligent intervention system set, the deviation signal to a second intelligent intervention system set;
wherein the EPS system, the ESP system and the ABS system are respectively assigned to the first intelligent intervention system set or the second intelligent intervention system set.

5. The intelligent intervention method based on an integrated TPMS according to claim 2, comprising:
transmitting, by the host, the deviation signal to any system of the EPS system, the ESP system and the ABS system; and
sequentially transmitting, at first by the system that has received the deviation signal from the host, the deviation signal to other systems of the EPS system, the ESP system and the ABS system from one to another.

6. The intelligent intervention method based on an integrated TPMS according to claim 2, performing the intelligent intervention comprising: adjusting a steering wheel angle, a gear and an output or a speed of the tire.

7. The intelligent intervention method based on an integrated TPMS according to claim 1, wherein the host is an individual host or a host integrated in a body control module.

8. The intelligent intervention method based on an integrated TPMS according to claim 1, wherein the vehicle in the abnormal status is a vehicle that has a flat tire.

9. An intelligent intervention apparatus comprising:
an intelligent intervention system that performs intelligent intervention for a vehicle;
an integrated tire pressure monitoring system (TPMS) comprising:
a direct TPMS that monitors a tire pressure and a tire temperature of the vehicle; and
an indirect TPMS that monitors a wheel speed of the vehicle;
a host coupled with the integrated TPMS and configured to receive the tire pressure, the tire temperature and the wheel speed;
judge in real time whether the vehicle is in a normal status or in an abnormal status via integrating the tire pressure, the tire temperature and the wheel speed;
produce a deviation signal when the tire pressure, the temperature and the wheel speed deviate from normal thresholds; and
transmit the deviation signal to the intelligent intervention system;
wherein the intelligent intervention system performs the intelligent intervention to slow down the vehicle in a straight line until the vehicle stops, when the deviation signal is received.

10. The intelligent intervention apparatus according to claim 9, wherein the intelligent intervention system at least comprises an electric power steering (EPS) system, an electronic stability program (ESP) system and an anti-lock braking (ABS) system.

11. The intelligent intervention apparatus according to claim 10, wherein the host is configured to transmit the deviation signal to the EPS system, the ESP system and the ABS system.

12. The intelligent intervention apparatus according to claim 10, wherein the EPS system, the ESP system and the ABS system are respectively assigned to a first intelligent intervention system set or a second intelligent intervention system set;
the host is configured to transmit the deviation signal to the first intelligent intervention system set; and
a system that belongs to the first intelligent intervention system set is configured to transmit the deviation signal to the second intelligent intervention system set.

13. The intelligent intervention apparatus according to claim 10, wherein the EPS system, the ESP system and the ABS system are coupled in a form of a chain and only one of the EPS system, the ESP system and the ABS system is configured to receive the deviation signal from the host; and
when the deviation signal is received, the EPS system, the ESP system and the ABS system are configured to transmit the deviation signal from one to another.

14. The intelligent intervention apparatus according to claim 10, wherein the intelligent intervention system is configured to adjust a steering wheel angle, a gear and an output or a speed of the tire.

15. The intelligent intervention apparatus according to claim 9, wherein the host is an individual host or a host integrated in a body control module.

16. The intelligent intervention apparatus according to claim 9, wherein the vehicle in the abnormal status is a vehicle that has a flat tire.

* * * * *